United States Patent [19]

Howell, IV et al.

[11] Patent Number: 4,954,974

[45] Date of Patent: Sep. 4, 1990

[54] TURBINE ENGINE FAN SPEED MONITOR

[75] Inventors: John S. Howell, IV, Warson Woods, Mo.; Kenneth P. Widner; Gary D. Guenther, both of Fort Worth, Tex.

[73] Assignee: Howell Instruments, Inc., Fort Worth, Tex.

[21] Appl. No.: 284,710

[22] Filed: Dec. 15, 1988

[51] Int. Cl.$^5$ ............................................. G08B 21/00
[52] U.S. Cl. ................................ 364/551.01; 340/945; 364/431.02
[58] Field of Search .................... 340/945; 364/431.02, 364/550, 551.01

[56] References Cited

U.S. PATENT DOCUMENTS

| | | | |
|---|---|---|---|
| 3,736,796 | 6/1973 | Hohenberg | 73/178 T |
| 4,212,064 | 7/1980 | Forsythe et al. | 340/945 X |
| 4,467,599 | 8/1984 | Moore | 60/39,281 X |
| 4,478,038 | 10/1984 | Cropper et al. | 60/39.02 |
| 4,578,756 | 3/1986 | Rosenbush et al. | 364/431.02 |
| 4,606,189 | 8/1986 | Charrier | 60/39.03 |
| 4,619,110 | 10/1986 | Moore | 60/39.091 |
| 4,712,372 | 12/1987 | Dickey et al. | 60/39.281 |
| 4,787,053 | 11/1988 | Moore | 340/945 X |
| 4,821,216 | 4/1989 | Howell et al. | 340/945 X |
| 4,881,184 | 11/1989 | Abegg, III et al. | 364/551.01 |

*Primary Examiner*—Parshotam S. Lall
*Assistant Examiner*—Edward R. Cosimano
*Attorney, Agent, or Firm*—Cushman, Darby & Cushman

[57] ABSTRACT

A turbine fan speed monitor for use with an aircraft engine which monitors actual fan speeds for each of a plurality of aircraft engines. The apparatus also input instantaneous values of total air temperature, pressure altitude, altitude rate, and the position of the wheels. The fan speed monitor calculates an overspeed limit value for the turbine fan as a function of each of the total air temperature, pressure altitude, altitude rate, and position of the wheels data and indicates when the actual fan speed exceeds the overspeed limit value for each monitored engine. The monitor warns the pilot of calculated overspeed conditions that he can control by throttle manipulation. Engine life is related to the calculated speeds at take-off, climb and cruise. The monitor keeps a record of the time and duration of these instances when the actual fan speed exceeds the overspeed limit for any engine. The monitor may also include a display to indicate the value of any of the calculated or sensed parameters including the frequency of the actual fan speed exceeding the overspeed limit for any engine. The monitor may also include data entry controls to manually input engine data previously accumulated for a monitored engine.

15 Claims, 2 Drawing Sheets

TURBINE ENGINE FAN SPEED MONITOR

FIELD OF THE INVENTION

This invention relates to a turbine engine fan speed monitor. More particularly, this invention relates to an apparatus for monitoring turbine engine fan speed as a function of the total air temperature, the pressure altitude, the altitude rate, and the position of the wheels.

BACKGROUND OF THE INVENTION

Aircraft turbine engines are structured with a large fan which rotates at high speeds during engine operation. The maximum recommended speed of the fan is a function of several environmental conditions including the total air temperature, the pressure altitude, and the altitude rate. The maximum suggested engine fan speed, the overspeed limit value, is also a function of the operation of the aircraft; that is, the overspeed limit value is dependent upon whether the airplane is in takeoff, climb, or cruise operation. Electronic monitors to maintain the actual turbine fan speed below the overspeed limit value by controlling the flow of fuel to the engines are well known in the art. The typical fan speed monitor senses air temperature and pressure altitude and electronically selects an overspeed limit value from a manufacturer's list of recommended maximum engine fan speeds for each given temperature and pressure altitude. An overspeed condition existed whenever an actual engine fan speed exceeded a certain percentage of this recommended maximum engine fan speed. The typical fan speed monitor reduced the fuel flow to the engines whenever the fan speed exceeded the predetermined percentage.

For example, U.S. Pat. No. 4,467,599 to Moore discloses a fan speed control system that prevents an overspeed condition. The Moore apparatus automatically prevents the turbine fan from exceeding the overspeed limit by controlling the fuel flow to the engine. As shown in FIG. 1 of Moore, a pressure altitude sensor and a temperature probe determine altitude and temperature values which are then used to calculate the overspeed limit value. A limiter 40 insures that the turbine fan does not rotate faster than this overspeed limit by restricting the fuel flow to the jet engine whenever an overspeed condition exists.

However, the fan speed monitor according to Moore does not calculate the overspeed limit value as a function of either altitude rate or the position of the landing gear. Since the fan speed monitor according Moore calculates the overspeed limit value only as a function of total air temperature, pressure altitude and whether subordinate systems are operative, without reference to the change in altitude rate or the position of the wheels, the overspeed limit value determined by Moore is an imprecise value. Further, the Moore monitor cannot display the overspeed limit values or record the cumulative time during which these values have been exceeded during the flight. Moore thus does not indicate to the pilot when an overspeed condition has occurred. Moore also does not provide a means for maintenance personnel to find out, after the flight, the existence and duration of any overspeed condition. Such information regarding the existence and duration of any overspeed conditions is useful to determine the continued serviceability of the engine and the need for corrective maintenance. Finally, the apparatus to Moore does not allow the pilot or maintenance crews to input data from previous flights to progressively compile historical overspeed data for a particular engine.

U.S. Pat. No. 4,712,372 to Dickey provides an overspeed system redundancy monitor that determines a performance status of the overspeed system in an aircraft during the course of previous flights. However, this monitor controls the rotational speed of the turbine with respect to a single overspeed limit and does not determine the overspeed limit values using the measured conditions such as pressure altitude, total air temperature, change in altitude rate, and landing gear position.

Therefore, a fan speed monitor is needed which continuously calculates overspeed limits as a function of total air temperature, pressure altitude, altitude rate, and wheel position. Further, a fan speed monitor is needed which provides an instantaneous warning to the pilot and maintenance crews of an overspeed occurrence and makes a record of the frequency of overspeed occurrences as well as the time and duration of such occurrences. Finally, a fan speed monitor is needed which can be programmed with historical data such that as an engine is replaced, the previously accumulated historical data for that engine can be programmed into the monitor to continue the data accumulation, rather than begin compiling data anew.

SUMMARY OF THE INVENTION

In order to overcome the above disadvantages of known engine fan monitors, the present invention provides a monitor which calculates overspeed limits as a function of total air temperature, pressure altitude, altitude rate and wheel position. The present invention also provides an instantaneous warning light to the pilot when an overspeed condition occurs in any of a plurality of engines. The present apparatus also makes a record of engine speeds, the frequency of overspeed occurrences, environmental condition data, as well as a record of internal monitoring failures within the system. The present invention may also be programmed with previously accumulated engine data to continue the accumulation of engine data from a prior engine use.

An object of the present invention is thus to provide a monitor which continuously calculates overspeed limit values based not only upon pressure altitude and total air temperature, but also upon altitude rate and the position of the landing gear. The overspeed limit value is a function of each of these variables so that the present monitor will yield a more precise overspeed limit value than prior monitors which calculated overspeed limit values based substantially on pressure altitude and total air temperature without regard for the change in the altitude rate or the position of the wheels.

Another object of the present invention is to provide a numerical display to indicate current overspeed limit values, accumulated time during which these values have been exceeded by any engine, and the current value of the sensed parameters (total air temperature, pressure altitude, altitude rate and wheel position). This information assists maintenance personnel in determining the extent of necessary service to any engine after flight.

In accordance with these and other objects which will become apparent, the present invention will be described with particular reference to the accompanying drawings.

DETAILED DESCRIPTION OF THE PREFERRED EMBODIMENT

Figure 1:
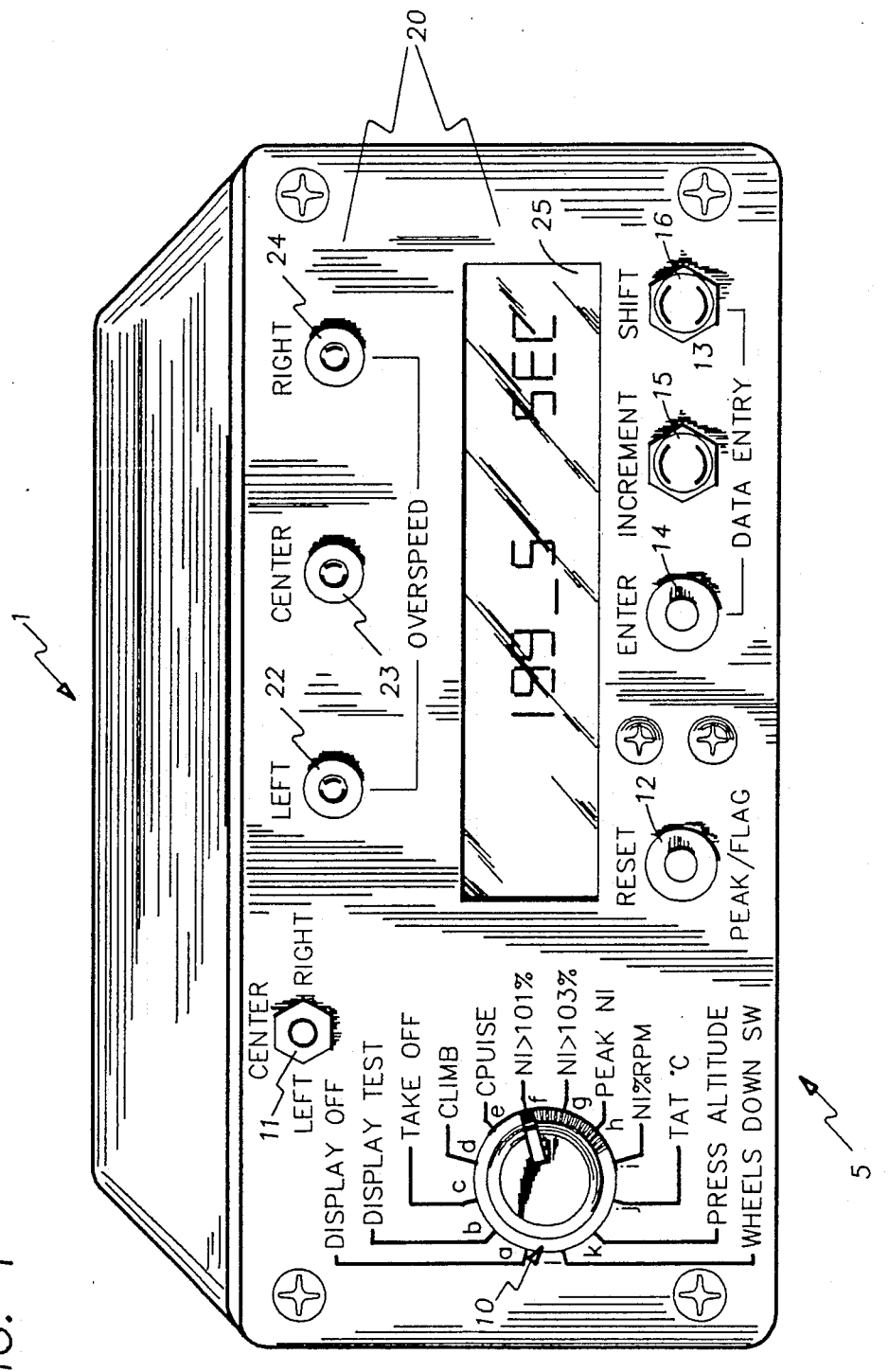
FIG. 1 is a perspective view of the fan speed monitor.

This is a new improved apparatus for calculating the overspeed limit values for aircraft turbine engine fans, for monitoring and controlling actual engine fan speeds, and for recording the frequency of overspeed conditions. FIG. 1 illustrates the fan speed monitor as it might appear to the operator. The front of the fan speed monitor 1 is equipped with a control panel 5 and a display 20. The control panel 5 consists of a mode select 10, an engine select 11, a reset switch 12, and data entry controls 13. The mode select switch 10 makes it possible to choose twelve modes of operation of the fan speed monitor. For example, selection 10a, the "display off" select, makes it possible to turn the display of the monitor off while continuing the internal operation of the monitor. While the mode switch is in the "display off" selection 10a, a scanning decimal point on the display indicates that the monitor power is on and that the monitor is functioning properly.

The "display test" select 10b provides a display with a predetermined test pattern so that it is possible to monitor the functioning of the display itself.

The N1 counts selections 10c, 10d and 10e make it possible to display the accumulated number of occurrences when the actual fan speed has exceeded the overspeed limit value in each of take-off, climb and cruise operations. The mode selects "N1 > 101%" 10f, and "N1 > 103%" 10g, make it possible to display the frequency of overspeed occurrences when the actual fan speed exceeds 101% and 103% of the rated RPM respectively.

The "peak N1" select 10h makes it possible to display the maximum actual engine fan speed which has occurred during the flight. Mode select switch "N1% RPM" 10i makes it possible to insert any values from a previous accumulation of engine data. This makes it possible to, for example, input the number of overspeed counts during a prior engine use into the current engine monitor to continue the counts where the previous monitor left off.

Mode select switches "TAT" 10j, "press altitude" 10k, and "wheels down" 10l make it possible to display the current values of the total air temperature, the pressure altitude, and the position of the wheels respectively.

Finally, the engine select 11 makes it possible to select any of the above mode select functions 10a through 10l for each of the left, center, and right aircraft engines. The present invention thus monitors the engine performance characteristics for each of three engines and makes it possible for personnel to inspect the operational performance of each engine independently.

The mode select 10 and engine select 11 make it possible to display data which is monitored and calculated by the fan speed monitor. These selectors may also be used in conjunction with the data entry controls 13 to display selected calculated or sensed values and to perform hardware self checks. For example, initial N1 counts can be preset by turning the mode select 10 to either "take-off" N1 counts, "climb" N1 counts, "cruise" N1 counts, "N1 > 100%," or "N1 > 103%" selections. The switch 14 is then pressed to activate the entry mode. The increment and shift switches 15 and 16 then make it possible to set a new value for the initial count. Pressing the enter switch again stores the value and exits the entry mode. The process can then be repeated to preset other counts by selecting a different N1 count function 10c through 10g and repeating the presetting process.

The monitor also has self-check circuitry which indicates when an external parameter was not received by the monitor on the previous flight during any time when the actual fan speed was greater than 80% of the overspeed limit value. The data entry controls 13 make it possible to display the amount of time the data was missed by pressing the increment button after the missed data prompt is displayed. Pressing the increment button once displays the time in seconds that the pressure altitude parameter was missed. Pressing the increment switch again displays the time in seconds that the total air temperature parameter was missed and a final press displays the time that the altitude rate parameter was missed. Pressing reset while the missed data is displayed clears out the missed time information for the next flight.

The control panel 5 of the fan speed monitor 1 also includes a display 20 including the warning flags 22, 23 and 24 and a numeric display 25. The fan speed monitor 1 may be equipped with three warning flags including a left warning flag 22, a center warning flag 23 and a right warning flag 24 corresponding to each of the left, center, and right engines respectively. The warning flags 22, 23 and 24 operate whenever the respective engine fan speeds exceed their respective overspeed limit values. This provides an instantaneous warning of an overspeed condition for each independent engine. Further, the numeric display 25 may be used to indicate the numeric value of a parameter selected on the mode select 10 and engine select 11 controls including, for example, the current value of overspeed limits for any engine, current value of the external parameters or the frequency of overspeed occurrences.

Finally, the control panel 5 includes a reset switch 12 to reset warning flags 22, 23 and 24 after an overspeed condition has occurred. The reset switch 12 also is used to clear the peak fan speed value. This will make it possible to begin a new duration of peak fan speed monitoring where the peak fan speed for the newly commenced period can again be displayed by selecting the peak N1 select 10h on the mode select 10.

In addition to the overspeed warning flags which operate on the face of the control panels, overspeed warning lamps are located on the cockpit panel (not shown) to immediately inform the pilot of the overspeed occurrence. The warning lamps illuminate when the overspeed condition occurs. The lamps cannot be reset by the pilot and will go out automatically when the engine returns to operation within limits, out of the overspeed condition.

Figure 2:
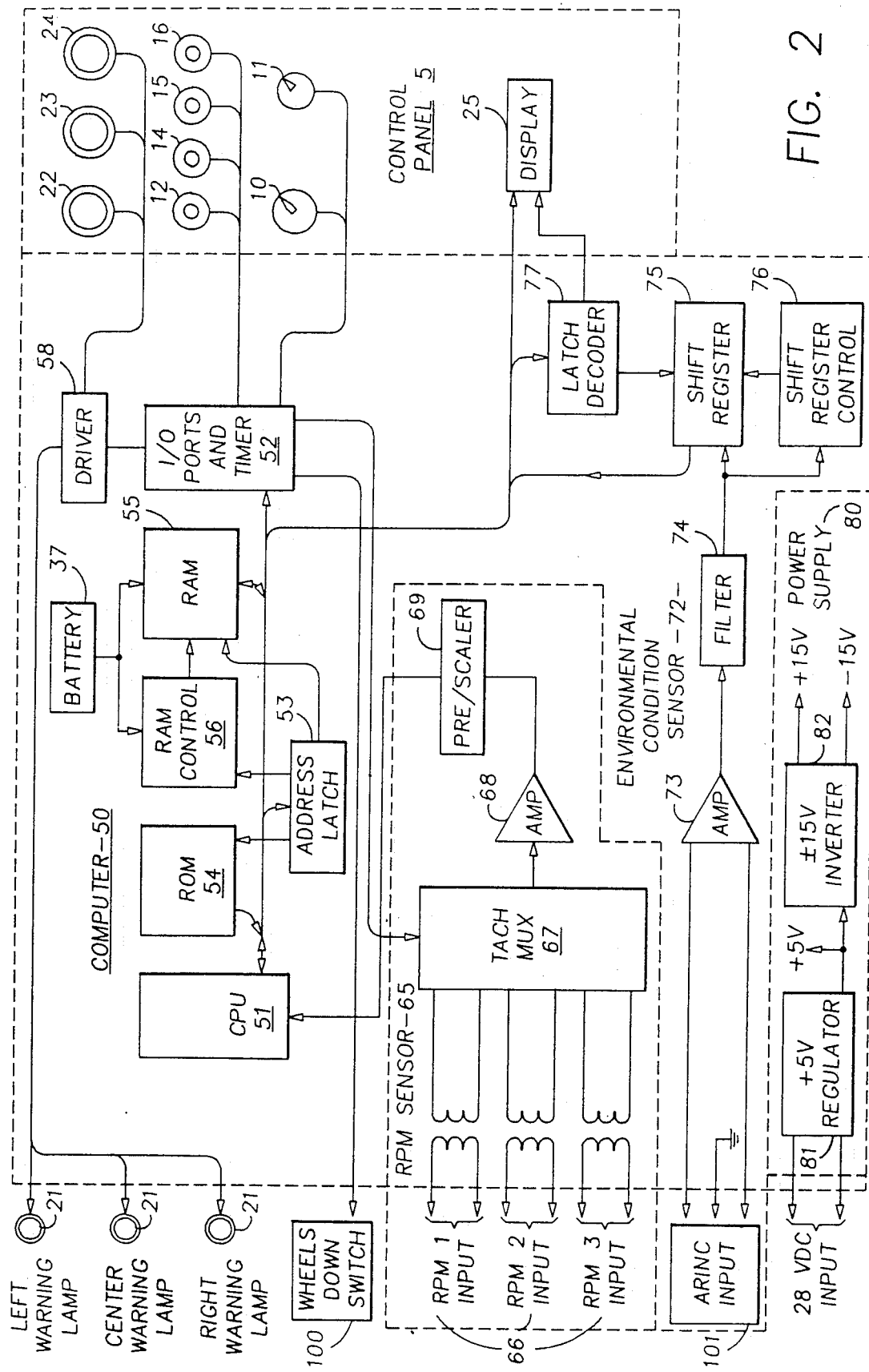
FIG. 2 is a block diagram of the fan speed monitor.

FIG. 2 shows a block diagram of the fan speed monitor circuitry. The actual turbine fan speed is monitored by the RPM sensor 65. The speed is input to the RPM inputs 66 with one RPM input detecting each engine respectively. The RPM signal is then input into a tach mux 67. The tach mux 67 receives an engine select signal from the I/O timer 52 of the computer 50 which periodically cues the tach mux 67 to selectively output a particular engine RPM signal. The selected engine RPM signal is then output by the tach mux 67 and is amplified through an RPM amp 68. The amplified RPM signal is then input into a prescaler 69 before it enters the computer 50 to be monitored and recorded. The prescaler 69 may be a dual clock, divide by 8 network, to scale the frequency of the amplified RPM signal before it inputs the CPU 51 of the computer 50.

The total air temperature, pressure altitude, and the altitude rate data may be obtained from independent sensors or they may be obtained, as the embodiment of FIG. 2 shows, from a well known ARINC 429 bus 101. From the ARINC bus, the environmental condition data is amplified by an environmental condition amplifier 73 and input to a filter 74. The filter 74 may be a Schmitt trigger nand gate for converting the ARINC signal to a digitally compatible output. The digital ARINC signal is then input into the shift register control 76 where it is synchronized with the master clock. The synchronized ARINC signal is then input to the serial-in, parallel-out shift registers 75 which release the synchronized signals onto the data bus at the prompt of the latch/decoder 77. The total air temperature, pressure altitude, and altitude rate data can then be read by the CPU off the data bus and can be displayed when the CPU 51 prompts the numeric display 25 to display the data off the data bus.

In addition to the RPM engine speed data and the environmental condition data, data defining the position of the wheels is also input to the computer 50. The position of the wheels data may be input through an external wheels position sensor 100. The computer 50 is thus input with the actual engine speed for each engine, the total air temperature, the pressure altitude, the altitude rate, and the position of the wheels by the RPM sensor 65, the environmental condition sensor 72, and the wheels position sensor respectively.

The computer 50 uses the engine speed, environmental condition and position of the wheels data to continuously calculate the overspeed limits for each monitored engine. Software programs for calculating overspeed limit values as a function of the continuously incoming RPM, environmental condition, and position of the wheels data are permanently stored within the ROM 54. The CPU 51 calculates the overspeed limit values based on program instructions which the CPU 51 receives from the ROM 54 using current values of the engine fan speed, total air temperature, pressure altitude, altitude rate, and the position of the wheels. A permanent record of the incoming data is kept in the RAM 55 for subsequent retrieval by maintenance personnel. Synchronization and timing of the various data signals traveling across the data bus is accomplished by the I/O ports and timer 52.

The final elements of the computer 50 include a RAM control 56, an address latch 53, and a battery 37. The RAM control 56 is a well-known logic control network for cueing the write and clear functions in the RAM 55. The address latch 53 is used in the present embodiment to increase the external CPU address capability. The battery 37 is a backup power supply for the RAM 55 and the RAM control 56 in the event of a power failure. In this way, useful information which has been input through the RPM sensor 65, the environmental condition sensor 72, and the wheels down switch, as well as calculated information from the CPU 51, all of which has been stored in the RAM 55, may be retrieved from the RAM 55 after a power failure.

The computer 50 is also electrically connected to the control panel 5 to receive signals input from the control panel and to output overspeed warning lamp and warning flag signals. The mode select switch 10 and the engine select switch 11, as previously discussed, may be used to select and display various sensed and calculated parameters from the fan speed monitor 1. The signals from the mode select switch 10 and the engine select switch 11 are input to the computer 50, specifically into the I/O ports and timer 52. The I/O ports and timer 52 interrupts the CPU 51 and releases the selected data onto the data bus. The CPU 51 then prompts the latch decoder 77 to enable the numeric display 25 to display the current data being input to the numeric display 25 on the data bus. In this manner, a sensed or calculated parameter may be selected to be visually displayed on control panel 5 as alpha numeric characters on the numeric display 25.

The reset switch 12 and the data entry controls 13 which, as discussed above, may be used to preset sensed and calculated parameters, and to perform system hardware checks, input signals to the I/O ports and timer 52. In response to these signals, the I/O ports and timer 52 interrupts the CPU 51 which performs the requested function in accordance with program steps stored in the ROM 54. The I/O ports and timer 52 is also connected to the warning lamps 21 through a driver 58. When the CPU 51 detects an overspeed condition, the CPU prompts the I/O ports and timer 52 to signal the illumination of the respective warning lamp 21 on the cockpit panel for the engine which exceeded the overspeed limit. The warning lamp will continue illuminating until the engine begins operating within overspeed limits. The I/O ports and timer 52 also operates the warning flags 22-24 when a respective engine exceeds overspeed limit values. The warning flags 22-24, located on the monitor control panel 5, will remain set until they are reset by the reset button 12.

The fan speed monitor is powered by a power supply 80, including regulator 81 and inverter 82, which inputs the aircraft's 28 volt dc output and regulates it, in a well known manner, to 5 volts, 15 volts, and minus 15 volts.

Thus, the fan speed monitor according to the present invention senses multiple fan speeds and compares the speed with independently calculated maximum fan speeds. The calculated maximum fan speeds are calculated by a CPU 51 based on a program which indicates the maximum fan speed as a function of each of total air temperature, pressure altitude, altitude rate, and the position of the wheels. The present invention senses and records each of these parameters and provides them for display at any time during the flight. The present invention also provides a method for presetting data already accumulated for a particular engine, allowing maintenance crews to progressively monitor overspeed history even though a monitor or an engine are moved from a particular aircraft to another.

While the invention has been described in connection with what is considered to be the most practical preferred embodiments, the applicant does not limit the invention to the disclosed embodiment but, on the contrary intends the invention to cover various modifications and equivalent arrangements included within the spirit and scope of the appended claims.

What is claimed is:

1. A turbine fan speed monitor for use with at least one aircraft engine having a rotating turbine fan with a variable overspeed limit value comprising:
   an RPM sensor for continually detecting actual fan rotational speeds of at least one aircraft engine;
   an environmental condition sensor for continually detecting environmental data defining at least total air temperature, pressure altitude and altitude rate; and a computer, electrically connected to the RPM sensor and the environmental condition sensor, for recording the actual fan speeds, for recording the environmental data, for determining overspeed limit values for each monitored aircraft engine as a function of the environmental data, and for comparing the overspeed limit values with the actual fan rotation speeds, the computer including memory means for recording at least the frequency of the actual fan speeds exceeding the overspeed limit values for each monitored engine.

2. A monitor as in claim 1 further including:

a display, electrically connected to the computer, for indicating the instantaneous values of at least one of:

the environmental data, the actual fan speeds for each monitored engine, the overspeed limit values for each monitored engine, the peak actual fan speed for each monitored engine, the frequency of actual fan speeds exceeding the overspeed limit values for each monitored engine, and the duration of actual fan speeds exceeding the overspeed limit values for each monitored engine.

3. A monitor as in claim 1 further including:

a plurality of warning lamps, electrically connected to the computer, for indicating the occurrence of the actual fan speeds exceeding the overspeed limit values for each monitored engine.

4. A monitor as in claim 1 further including:

a control panel, electrically connected to the computer, for manually inputting at least data defining a previously monitored frequency of actual fan speeds exceeding the overspeed limit values for any monitored engine.

5. A turbine fan speed monitor as in claim 1, wherein the memory means also records at least the duration of the actual fan speeds exceeding the overspeed limit values for each monitored engine.

6. A monitor as in claim 1 wherein the computer further includes:

self-check circuitry for identifying instances when the computer did not receive at least one of the environmental data and the actual fan speed.

7. A monitor as in claim 6 further including a display for indicating the occurrence of said instances when the computer did not receive at least one of the environmental data and the actual fan speed.

8. A monitor as in claim 6 further including a display for indicating the duration of said instances when the computer did not receive at least one of the environmental data and the actual fan speed.

9. A method for monitoring at least one aircraft engine having a rotating turbine fan with a variable overspeed limit value comprising the steps of:

detecting and recording the actual fan speeds of at least one aircraft engine;

detecting and recording environmental data defining at least total air temperature, pressure altitude and altitude rate;

determining overspeed limit values for each monitored aircraft engine as a function of the environmental data;

comparing the actual fan speeds to the selected overspeed limit values for each monitored engine; and recording the frequency of actual fan speeds exceeding the overspeed limit values for each monitored engine.

10. A method as in claim 9 further including the step of recording the duration of the actual fan speeds exceeding the overspeed limit values for each monitored aircraft engine.

11. A method as in claim 9 further including the step of displaying the instantaneous values of at least one of:

the environmental data, the actual fan speeds for each monitored engine, the overspeed limit values for each monitored engine, the peak actual fan speed for each monitored engine, the frequency of actual fan speeds exceeding the overspeed limit values for each monitored engine, and the duration of actual fan speeds exceeding the overspeed limit values for each monitored engine.

12. A method as in claim 9 including the step of displaying the occurrence of an actual fan speed exceeding the overspeed limit value for each monitored engine.

13. A method as in claim 9 further including the steps of monitoring and recording instances when at least one of the environmental data and the actual fan speeds was not detected.

14. A method as in claim 13 further including the step of indicating the occurrence of said instances when at least one of the environmental data and the actual fan speeds was not detected.

15. A method as in claim 14 further including the step of indicating the duration of said instances when at least one of the environmental data and the actual fan speeds was not detected.

* * * * *